US006159328A

United States Patent [19]

Gaikoski et al.

[11] Patent Number: 6,159,328

[45] Date of Patent: Dec. 12, 2000

[54] TAPE DISPENSER AND METHOD AND SYSTEM FOR APPLICATION AND SEVERANCE OF TWO-PART TAPE

[75] Inventors: Joseph Gaikoski, The Colony, Tex.; Zsolt Toth, Tuckahoe; Paul Chudy, New York, both of N.Y.

[73] Assignee: Zip Tape Systems, Inc., The Colony, Tex.

[21] Appl. No.: 08/931,275

[22] Filed: Sep. 16, 1997

[51] Int. Cl.$^7$ .......................... B32B 31/00; B32B 31/18; B32B 35/00

[52] U.S. Cl. .......................... 156/269; 156/270; 156/289; 156/324; 156/523; 156/527; 156/577; 156/579; 53/419

[58] Field of Search .................................... 156/268, 269, 156/289, 468, 470, 475, 486, 522, 423, 530, 537, 579, 527, 270, 329, 577; 229/181, 925; 53/419

[56] References Cited

U.S. PATENT DOCUMENTS

| | | | |
|---|---|---|---|
| D. 333,678 | 3/1993 | Lissoni . | |
| 1,032,026 | 7/1912 | Roden . | |
| 1,180,541 | 4/1916 | Roden . | |
| 2,709,049 | 5/1955 | Weis . | |
| 2,754,023 | 7/1956 | Sheridan . | |
| 2,771,385 | 11/1956 | Humphner . | |
| 3,504,844 | 4/1970 | Stark et al. . | |
| 3,753,839 | 8/1973 | Funke et al. | 156/579 X |
| 3,813,275 | 5/1974 | Weick et al. . | |
| 3,873,018 | 3/1975 | Donnay . | |
| 3,988,193 | 10/1976 | Arens . | |
| 4,039,367 | 8/1977 | Warshaw et al. | 156/486 |
| 4,148,678 | 4/1979 | Fogle et al. . | |
| 4,151,039 | 4/1979 | Lash . | |
| 4,227,955 | 10/1980 | Woods et al. | 156/269 |
| 4,762,586 | 8/1988 | Wilkie . | |
| 4,781,786 | 11/1988 | Lerner et al. | 156/468 |
| 4,869,769 | 9/1989 | DiRusso, Jr. et al. | 156/269 |
| 4,889,581 | 12/1989 | Ulrich et al. | 156/468 X |
| 4,936,464 | 6/1990 | Kim . | |
| 4,964,942 | 10/1990 | Tsuda | 156/468 |
| 5,035,328 | 7/1991 | Kim . | |
| 5,054,618 | 10/1991 | Kim . | |
| 5,197,386 | 3/1993 | Lin | 156/579 X |
| 5,310,437 | 5/1994 | Tucker . | |
| 5,310,445 | 5/1994 | Tucker . | |
| 5,318,658 | 6/1994 | Goodman | 156/468 |
| 5,326,421 | 7/1994 | Taylor . | |
| 5,350,099 | 9/1994 | Kienzle . | |
| 5,366,775 | 11/1994 | Kao . | |
| 5,381,942 | 1/1995 | Lin . | |
| 5,392,783 | 2/1995 | Fogarty et al. . | |
| 5,456,792 | 10/1995 | Rodriguez et al. . | |
| 5,472,560 | 12/1995 | Horng . | |
| 5,478,000 | 12/1995 | Jensen . | |
| 5,482,182 | 1/1996 | Thompson et al. . | |
| 5,491,956 | 2/1996 | Donnelly et al. . | |
| 5,514,244 | 5/1996 | Krukas | 156/468 |
| 5,518,576 | 5/1996 | Mendelovich et al. . | |
| 6,004,424 | 12/1999 | Faust . | |

FOREIGN PATENT DOCUMENTS

| | | |
|---|---|---|
| 579474 | 7/1959 | Canada . |
| 906429 | 8/1972 | Canada . |
| 2187435 | 2/1995 | Canada . |

*Primary Examiner*—Curtis Mayes
*Attorney, Agent, or Firm*—Antonelli, Terry, Stout & Kraus, LLP

[57] ABSTRACT

A device is disclosed for taping surfaces, particularly for taping containers, such as cartons and boxes, and other enclosures to be sealed, such as bags, for which seal tape is desired. Also disclosed are a method and system for applying tape, severing tape, and adding these features to existing hand-held, assembly-line, and other automatic taping devices. In particular, the method and system is directed to applying a strip to an adhesive side of a tape at the point that the tape is applied to a container or other item being taped, in a manner that allows easy opening of a container sealed by the tape by pulling the strip. This method and system obviates the need for use of a cutting device to open a taped container, which protects both the surface and the contents of any containers taped and the user. The tape dispenser includes a two-dimensional cutting device to both cut the two-part tape apart and to insert cuts of the adhesive tape at opposite sides of the plastic strip, so as to facilitate opening of the container seal by splitting the tape in half upon pulling the plastic strip.

14 Claims, 11 Drawing Sheets

TAPE DISPENSER AND METHOD AND SYSTEM FOR APPLICATION AND SEVERANCE OF TWO-PART TAPE

FIELD OF THE INVENTION

The present invention generally relates to a device for taping surfaces, particularly for taping containers, such as cartons and boxes, and other enclosures to be sealed, such as bags or chambers, for which seal severing tape is preferred. In addition, the present invention relates to a method and system for applying tape, severing tape, and adding the features of the present invention to existing handheld, assembly-line, and other automatic taping devices.

BACKGROUND OF THE INVENTION

A significant problem in packaging materials, particularly in boxes, exists in both sealing the box or carton and unsealing it. To seal a carton or box securely, various types of tape are typically used, and a cutting tool is generally required to cut the sealing tape and open the container.

Knives or scissors, which are often used in opening packages, present the problem of accidentally causing injury by cutting the person opening the package. Also, damage to the goods contained in the carton by the cutting instrument can present a major concern.

In the existing art, tape used to aid opening of containers includes, for example, the ancient patents to Roden, U.S. Pat. Nos. 1,032,026 and 1,180,541, which provide a taping scheme to seal cans or containers. This early tape provided a string under an adhesive tape with an end extending outwardly from the end of the tape to pull and attempt to sever the tape. A significant problem with this arrangement of tape and string is the inability to correctly place the string relative to the tape so that pulling the string will actually sever the tape. Further, problems with preventing dirt on the adhesive side of the tape and loss of adhesiveness of the tape using such a string often occurred.

The attempt of U.S. Pat. No. 2,771,385 to avoid these latter problems by adhering the string to the adhesive side of the tape further suffered from problems of aligning the string onto the adhesive tape so that the tape would be severed. These types of problems have prevented this type of adhesive tape from being readily usable in the packaging industry. A particular problem with all of these prior schemes resulted from the attempt to form the adhesive tape with the string independently of the application of the tape to sealing boxes.

As such, tape dispensers were developed without consideration of a mechanism to sever such tapes during opening of cartons. For example, U. S. Pat. Nos. 3,813,275; 5,326,421; and 5,350,099 were developed as types of tape dispensers, but none of these utilized, or could utilize, the type of tape described above. Each of these prior devices involved a tape dispenser of a hand-held type for applying tape to a package. However, none are directed to the application of a tape having a mechanism for severing the tape after its application to facilitate opening of a container.

Several prior patents are directed to tape dispensers where a backing tape is drawn from a strip of adhesive tape. These types of tapes, which are designed to prevent the adhesive tape from loosing its stickiness, include those described in U.S. Pat. Nos. 4,151,039 and 5,456,792. However, none of these prior arrangements provide any direction for applying tape to a closure surface of a container with a mechanism to apply or seal the tape from that surface in such a manner that the tape may be severed or unsealed without the use of a cutting tool.

Other problems also are unaddressed by the existing art for taping. For example, the tape user may wish to contain a package or other container within a reusable overpack container—a container that contains another container—by a severable tape layer that provides a mechanism for opening the overpack container without rupturing the inner package. No reusable uses of this type of tape for this purpose have been addressed by the existing art.

SUMMARY OF THE INVENTION

It is an object of the present invention to solve the problems of the existing art by providing a tape dispensing device specially designed to apply seal severing tape, which adds a strip to an adhesive side of a tape for splitting adhesive tape after it has been applied to a surface in order to facilitate opening of a package.

It is a further object of the present invention to provide a replaceable strip cartridge containing strip material that can be installed on conventional hand-held taping devices.

It is a further object of the present invention to provide a replaceable strip cartridge containing strip material that can be installed on conventional automatic taping machines.

It is a further object of the present invention to provide a replaceable cutting device for installation on conventional hand-held or automatic taping devices that cuts both the tape and the applied strip.

It is a further object of the present invention to provide a replaceable slitting device for slitting the tape on either side of the applied strip at the cut point of the tape in order to facilitate strip removal and splitting of the applied tape.

It is a further object of the present invention to provide a pivoting strip cartridge holder of a replaceable strip cartridge for automatic taping devices.

It is a further object of the present invention to provide a cartridge holder of a replaceable strip cartridge for hand-held taping devices.

It is a further object of the present invention to provide a cartridge holder such that the replaceable strip cartridge is held so as to position the strip from the cartridge at the center of the adhesive side of the tape.

It is a further object at the present invention to provide a reusable overpack container use of a seal severing tape.

In particular, the present invention includes a replaceable strip cartridge for applying a strip to an adhesive side of a tape as the tape is applied to a surface. The strip cartridge of the present invention is designed to be removed from the tape dispenser and replaced with another strip cartridge upon the expiration (complete use) of the strip. Moreover, the replaceable strip cartridge of the present invention is constructed to unwind the strip in a manner to always be centered on the adhesive side of tape as the tape is applied to a surface.

Further, an embodiment of the present invention includes a cutting device for cutting the adhesive tape and strip combination in a manner such that the strip may then be easily gripped at an end and pulled to break the seal of the adhesive tape on the surface applied without injury to the person breaking the seal and without damage to the surface or contents of any taped containers. In addition, the present invention allows the tape to be used for other purposes, such as to provide method for use of a reusable overpack or other container, the inner contents of which may later be removed simply by splitting the tape using the strip.

An embodiment of the present invention is usable as a hand-held device. Another embodiment allows mounting of the present invention on an automatic taping device, such as a conveyor apparatus, allowing automatic application of the adhesive tape and strip combination to tape or seal a number of containers via use of an assembly line.

An embodiment of the present invention has a first holder or roll for adhesive tape to be applied to a surface to be taped, a strip cartridge for presenting a strip of material for application to an adhesive side of the tape, a mechanism for applying the strip to the adhesive side of the tape along the centerline of the tape, and a cutting mechanism for cutting the joined tape and strip combination. The cutting mechanism of an embodiment of the present invention is designed to cut in two dimensions so as to leave the cut end of the tape combination with edge slices bordering the applied strip. These slices allow the secondary strip to be pulled outwardly from the tape after its application so that the tape is split along its length at its centerline upon strip removal. The cutting is accomplished according to an embodiment of the present invention by use of a first cutting blade having an additional pair of cutting implements situated perpendicularly to the first cutting blade.

In an embodiment of the present invention, the strip cartridge consists of a hollow cylindrical container having a central winding core on which the plastic strip is wound. The winding of this strip is in a manner to force the end of the strip to always be centered at a central opening along the side of the strip cartridge. This arrangement biases the strip to the center of the tape as the strip is applied to an adhesive side of the tape.

In an embodiment of the present invention, a mounting bracket is attached to the strip cartridge that allows the strip cartridge to be held in place using attachments for the existing handle of a conventional hand-held taping device. In this embodiment, the connection of the cartridge to the taping device is relatively permanent upon use of the tape dispenser, but it is designed so that the strip cartridge can be readily removed in order to replace the strip cartridge with a new strip cartridge once the strip has been expended. In addition to adding the strip cartridge and mounting, according to the present invention, the cutting tool of a conventional hand-held taping device is replaced by a specialized cutting tool of the present invention, with the two-dimensional cutting feature.

An embodiment of the present invention designed for use with an automatic tape dispenser includes features for mounting the strip cartridge onto a conventional taping device of a conveyor for sealing cartons or boxes. On such a conveyor, unsealed multiple cartons or boxes, for example, are moved along, and are automatically sealed as they pass the taping device. The taping device or machine is modified to allow mounting of the strip cartridge to a conventional automatic taping machine that uses adhesive tape. In addition, the cutting tool of a conventional automatic taping machine is replaced by the cutting tool of the present invention, with the two-dimensional cutting feature. A continuous process of taping containers or boxes using the present invention may thus be achieved on a conveyor.

To achieve the stated and other objects of the present invention, as embodied and described below, the invention includes a tape dispenser having a feature for dispensing tape having an adhesive side, such a tape roll holder and guide, a feature, such as a strip cartridge, for dispensing a strip and biasing the strip so as to be applied along the centerline of the adhesive side of the tape, and a specialized cutter for cutting both the tape and the strip and also slitting the tape adjacent and parallel to the applied strip at the cut end of the tape.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

In the figures:

FIGS. 1A and 1B show the box sealed by the use of the present invention, while FIGS. 1C and 1D show the box being opened in accordance with the present invention. FIG. 1E shows an end, cross-sectional view of the ears of a box and the applied tape and strip combination of the present invention. FIG. 1F shows an end, cross-sectional view of the applied tape an strip combination of the present invention at the end of the tape.

FIGS. 2A and 2B show the overpack container without and with its closing flap folded, respectively. FIG. 2C shows the folded flap sealed by the tape and strip combination of the present invention. FIGS. 2D and 2E show the overpack container being opened in accordance with the present invention.

DETAILED DESCRIPTION

The present invention generally describes a device for taping surfaces, particularly for taping containers, such as cartons and boxes, and other enclosures to be sealed, such as bags or chambers, for which seal severing tape, which adds a strip to an adhesive side of a tape for splitting the tape after it has been applied, is desired. In addition, the present invention describes a method and system for applying tape, severing tape, and adding the features of the present invention to existing hand-held, assembly-line, and other automatic taping devices. In particular, the method and system of the present invention is directed to applying a strip to an adhesive side of a tape as the tape is applied to a container or other item being taped, in a manner that allows severing of the tape by pulling the strip. This method and system obviates the need for use of a cutting device to open a taped container, which protects both the surface and the contents of any containers taped, and allows other uses of the tape, such as to provide a severable separation layer among bags or chambers.

Figure 1A:
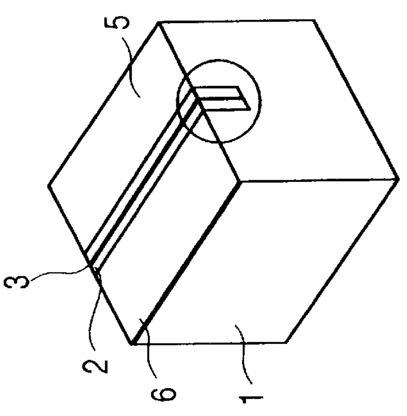
FIGS. 1A, 1B, 1C, 1D, 1E, and 1F present views of sealing and unsealing a box according to the present invention, where

An important feature of an embodiment of the present invention allows application of a combination tape and strip to a surface, such as a box, carton, or other container, where the combination tape and strip itself can be easily used to open the box without the use of a cutting means. In this arrangement, as shown in the example of FIG. 1A, a typical box 1 has ear flaps 5 and 6 sealed closed by the combination tape 2 and strip 3 of the present invention. This tape, which may be more clearly seen in FIG. 1B, includes an adhesive tape 2 for sealing the box with a narrower, centered, non-adhesive strip 3, comprised, for example, of plastic, located between the tape 2 and the box 1. The tape 2, as it is applied to the box with the strip 3, is cut off at an end, while a cutting device (not shown) makes two additional parallel slits 4*a* and 4*b* at each side of the strip 3.

Figure 1B:
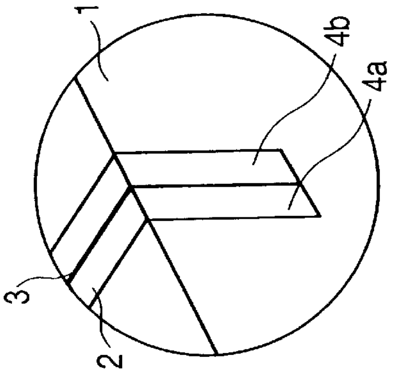
Figure 1C:
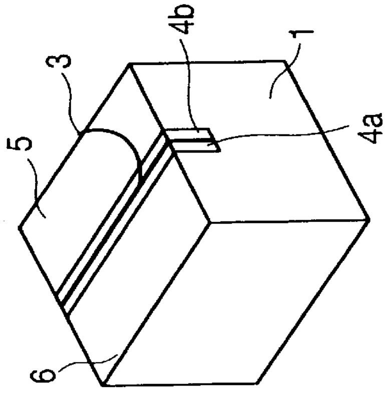
Figure 1D:
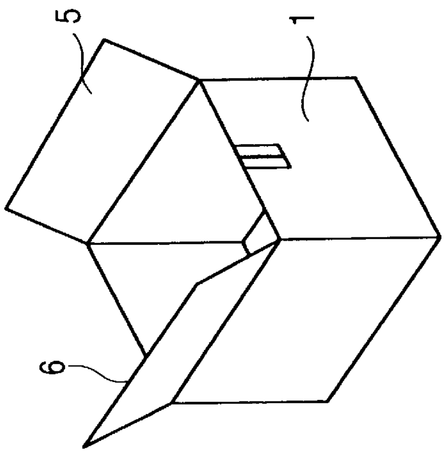

As shown in FIG. 1C, to open the box 1, the strip 3 between the slits 4*a* and 4*b* is gripped at the edge or end of the tape, and pulled upwardly and outwardly from the box to break the seal of the box with the tape 2. The strip 3 is pulled to the opposite end of the tape to completely break the seal of the tape 2 over the box ears 5 and 6, to thus enable the opening of the box 1; the opened box 1, with ears 5 and 6 extended, is shown in FIG. 1D.

Figure 1E:
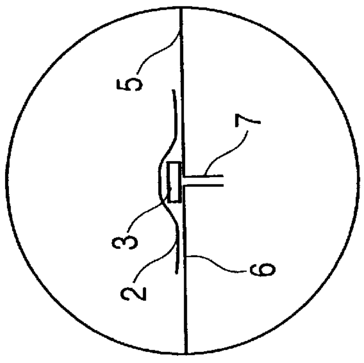

FIG. 1E presents an end view of the tape and strip combination after application to a surface, such as a box as shown in FIGS. 1A to 1C. As shown, the tape 2 overlies the strip 3 which is applied so as to be positioned near the point 7 where the two flaps 5 and 6 come together at the top of the box (not shown; see FIGS. 1A to 1C. When the strip 3 is removed, the tape 2 splits along its centerline, where the strip 3 previously was located. In FIG. 1E, this splitting of the tape 2 then allows the flaps 5 and 6 to be opened.

Figure 1F:
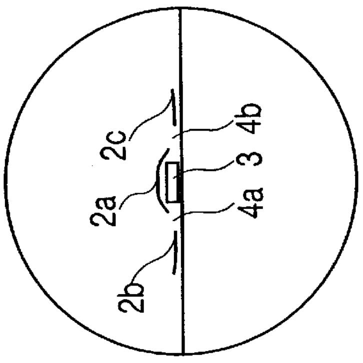

FIG. 1F presents an end view of the tape and strip combination after application to a surface, at the end of the tape, such as a box as shown in FIG. 1B. As shown, between the slits 4*a* and 4*b*, the middle section of the tape 2*a* overlies the strip 3, while two other portions of the tape 2*b* and 2*c* are split by the slits 4*a* and 4*b* from the center portion of the tape 2*a*. This slitting 4*a* and 4*b* at the end of the tape 2*a*, 2*b*, and 2*c*, facilitates removing the strip 3, so that when the strip 3 is removed, the center portion of the tape splits along its centerline (not shown; see FIG. 1C), where the strip 3 was previously located.

Figure 2A:
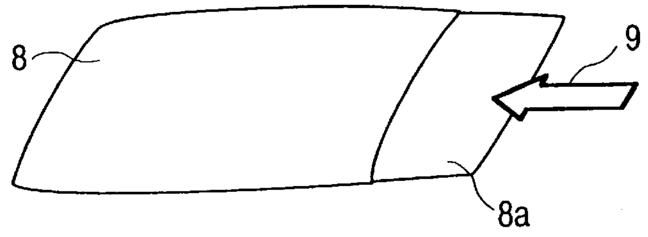
FIGS. 2A, 2B, 2C, 2D, and 2E presents various stages of sealing and unsealing an example overpack container according to the present invention, where
Figure 2B:
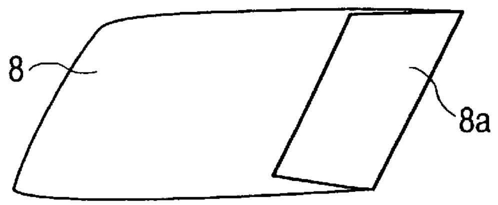
Figure 2C:
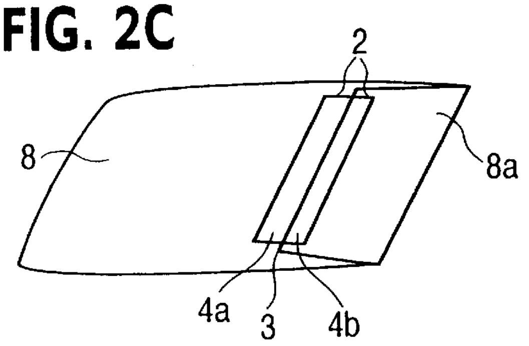
Figure 2D:
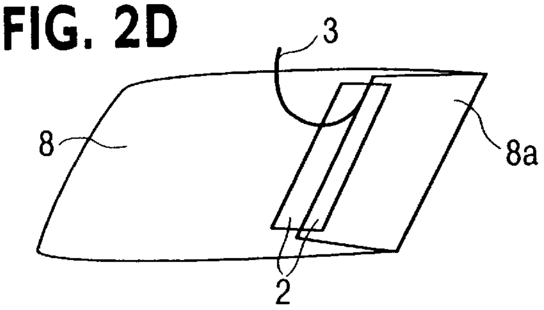
Figure 2E:
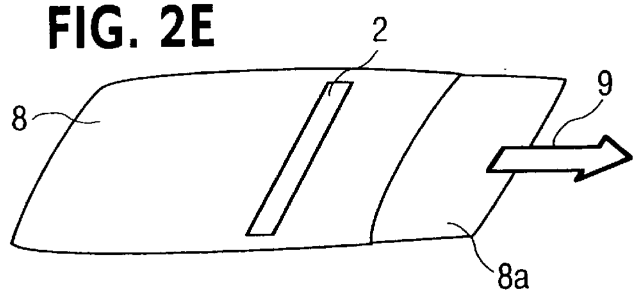

FIGS. 2A, 2B, 2C, 2D, and 2E present the application of an embodiment of the present invention to an example reusable overpack container. FIG. 2A presents an overpack container 8 having an end flap 8*a* for closing the container 8. Items 9 to be contained in the container 8 may be inserted past the unfolded flap 8*a*. As shown in FIG. 2B, the container 8 is closed by folding over the flap 8*a*. As shown in FIG. 2C, a tape 2 and strip 3 combination is applied over the container 8 and flap 8*a* so as to seal the container 8 closed. According to an embodiment of the present invention, a pair of slits 4*a* and 4*b* parallel to the strip 3 are made as the tape 2 and strip 3 combination is cut. As shown in FIG. 2D, in order to open the container 8, the strip 3 is pulled so as to split the tape 2. As shown in FIG. 2E, once the tape 2 is split, the flap 8*a* may be unfolded and any contents 9 of the container 8 may be removed past the unfolded flap 8*a*.

Figure 3:
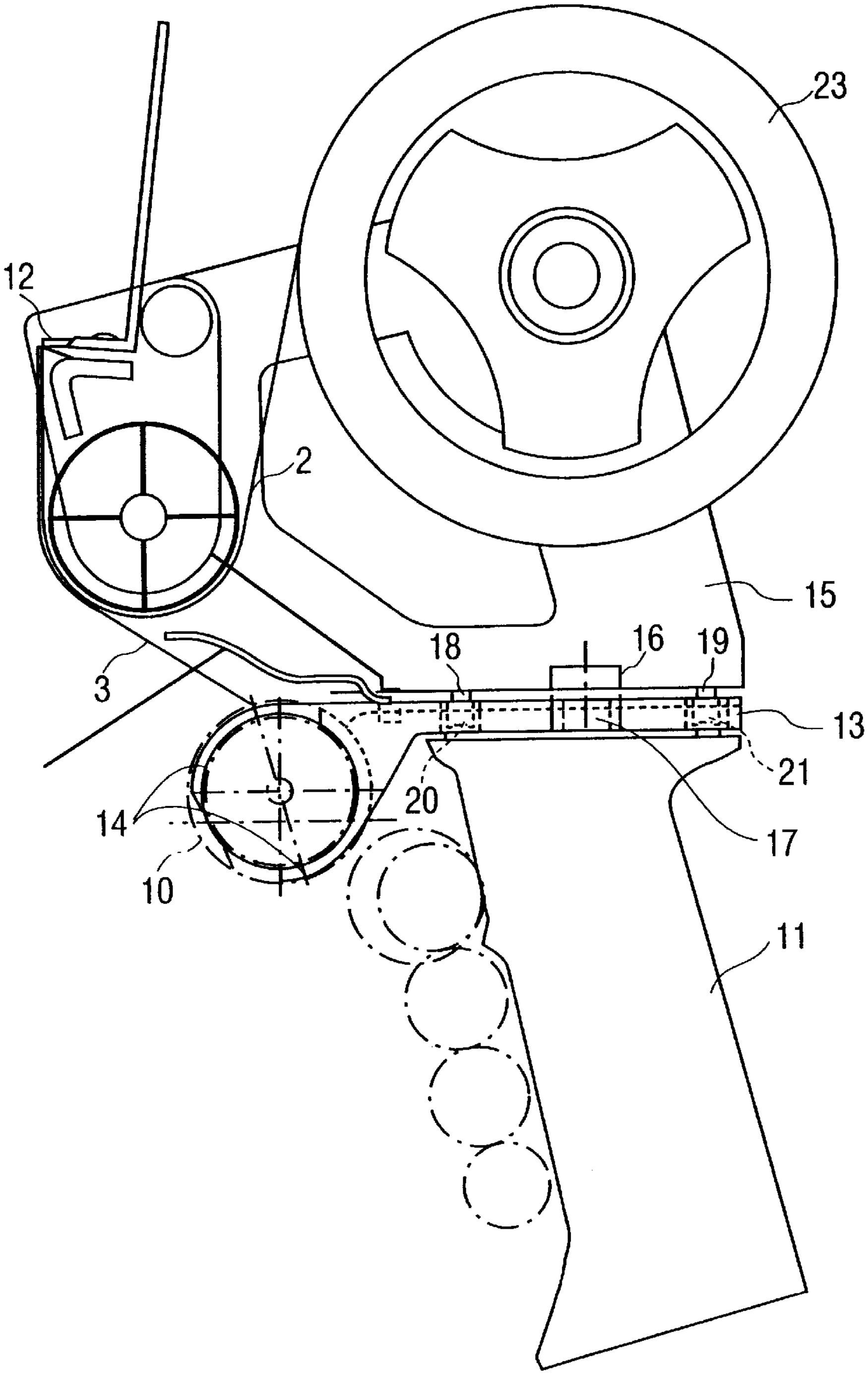
FIG. 3 shows a side view of an embodiment of the hand-held tape dispenser according to the present invention.

FIG. 3 presents a hand-held embodiment of the present invention. In this embodiment, a strip cartridge 10 and cartridge holder 14 is attached via the handle 11 of a conventional hand-held tape dispenser. In addition, in an embodiment of the present invention, a cutting device 12 of the present invention replaces the cutting device of the conventional dispenser. According to an embodiment of the present invention, attached to the strip cartridge holder 14 is a plate-like bracket 13. As shown in FIG. 3, in an embodiment of the present invention, the bracket 13 is held between the handle 11 and the body 15 of the conventional hand-held tape dispenser by way of a bolt or screw 16, or some similar means, through an opening 17 in the bracket 13. The bracket 13 is oriented between the handle 11 and the body 15 by way of stems 18 and 19 (and also 18*a* and 19*a*, not shown; 18*a* and 19*a* are shown in FIG. 3A) extending through openings 20 and 21, respectively, in the bracket 13. The strip 3 extends from the strip cartridge 10 and feeds to the adhesive side of the tape 3. The tape 2 feeds from a tape roller or other device for holding tape 23, which is a feature common to the conventional dispenser.

Figure 4A:
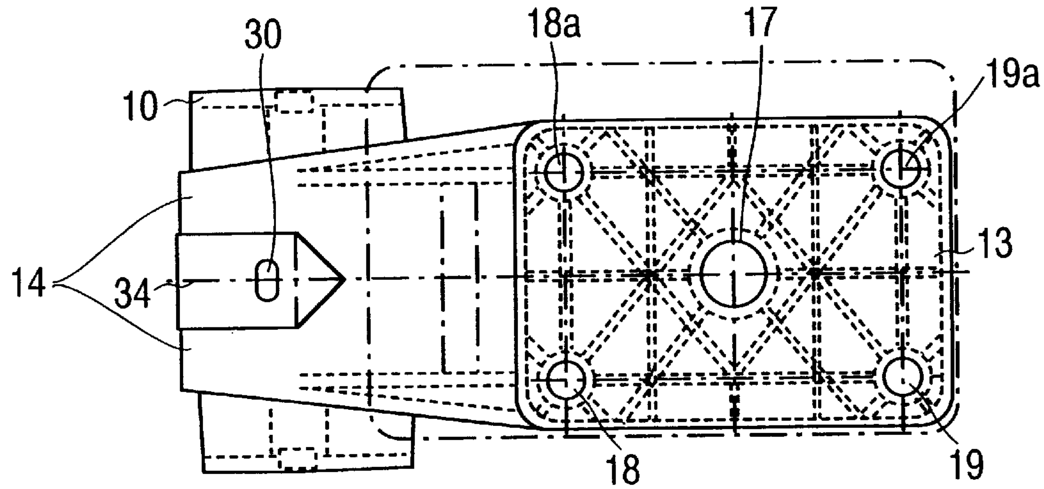
FIGS. 4A and 4B show a side view and a top view of the strip cartridge holder and attachment feature of a hand-held embodiment of the present invention.
Figure 4B:
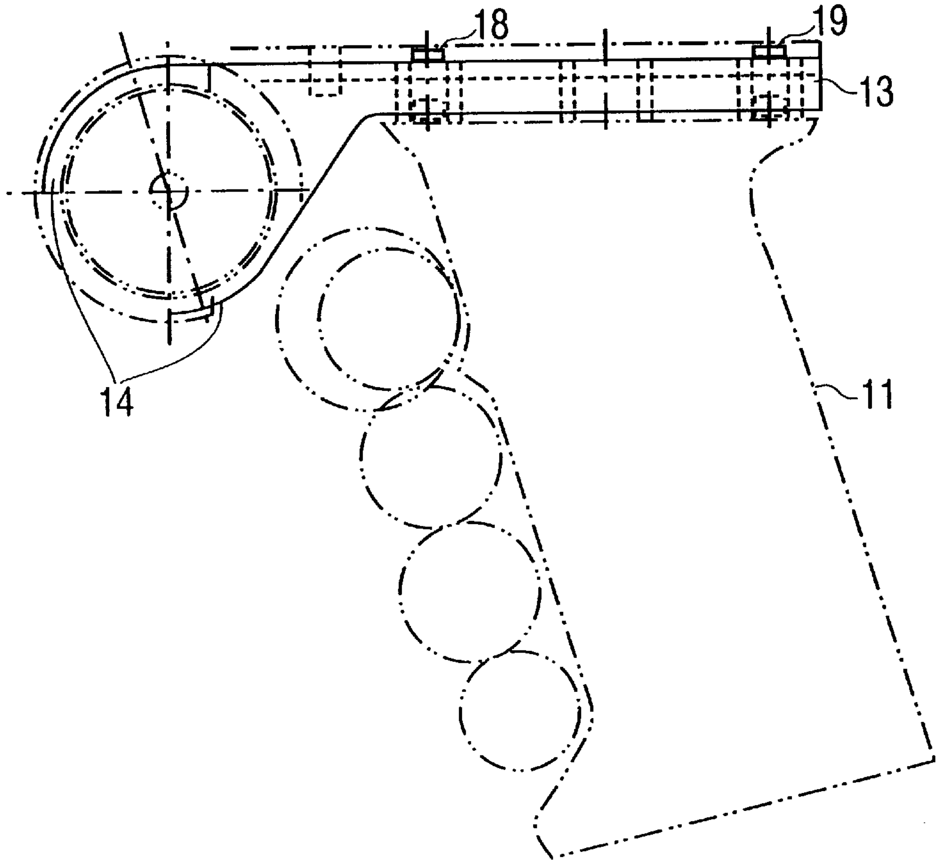

FIGS. 4A and 4B further detail the bracket and strip cartridge holder feature of a hand-held embodiment of the present invention. As shown in FIG. 4A, the plate-like bracket 13 has finger-like holders 14 that narrow to provide a mechanism for positioning and holding the strip cartridge 10, such that the raised ridge 34 of the cartridge 10 fits between the finger-like holders 14, centering the hole 30 from which the strip (not shown) protrudes. As may be seen in FIG. 4B, the finger-like holders 14 also extend partially around the cylindrical-like strip cartridge 10. In an embodiment of the present invention, the cartridge and bracket have an approximately one inch diameter. In another embodiment of the present invention, the cartridge and bracket have an approximately 2½ inch diameter.

Figure 5A:
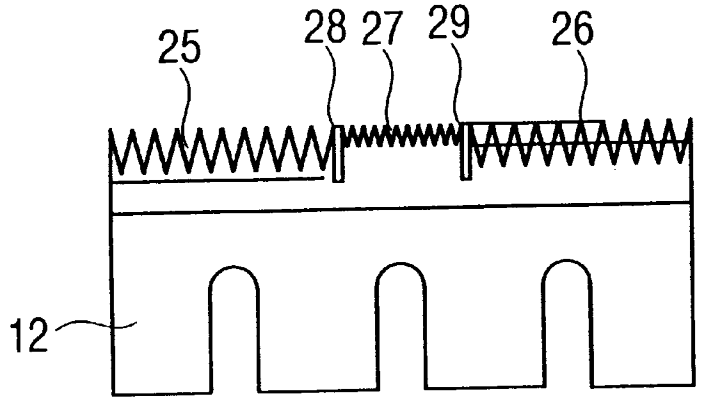
FIGS. 5A and 5B contain the novel structure of the two-dimensional cutter for cutting and slitting the tape combination of the present invention.
Figure 5B:
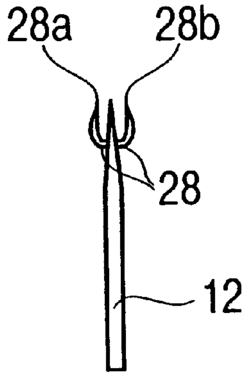

The cutting mechanism 12 of an embodiment of the present invention is further detailed in FIGS. 5A and 5B, wherein a two-dimensional cutting feature is described. In this embodiment, FIG. 5A shows two pluralities of cutting teeth 25 and 26 on either side of another plurality of teeth 27. In addition, a second pair of cutting features 28 and 29, perpendicular to the sets of cutting teeth 25, 26, and 27 is shown. This second feature 28 and 29 is used to form slits in the adhesive tape on each side of the strip (not shown; shown in FIGS. 1B and 1C). In addition, in an embodiment of the present invention, as shown by end view in FIG. 5B, the second feature 28 and 29 extends in both directions 28*a* and 28*b* from the pluralities of cutting teeth 25, 26, and 27. This two-directional extension slits the separating halves of the cut tape (not shown) on both ends (i.e., on the end applied to the surface and on the end remaining in the cutting device (not shown)). In this view, a cross-section of a second cutting feature 28 is shown (cutting feature 29, identical to feature 28 is not shown). Thus, with the method and system of the present invention, the cutting blade 12 cuts the adhesive tape and strip combination while the second cutting features 28 and 29 cut perpendicular slits at the ends of both the separated pieces of tape cut by the cutting teeth 25, 26, and 27. In an embodiment of the present invention, the two elements of the second feature 28 and 29 of the cutting device of the present invention 14 are mounted approximately ½ inch apart.

Installation of the elements of the present invention to a conventional handheld taping device is as follows. The handle of the conventional taping device is removed. The strip cartridge holder with holder extension is fitted via its openings to the extensions between the body of the conventional taping device and the handle. The handle is then reattached to the body, sandwiching the cartridge holder extension between the handle and the body. The conventional cutting device of the conventional taping device is then removed and replaced with the cutting device of the present invention. Typically this is accomplished by simply removing the screws or other attachments fixing the conventional cutting device and then reattaching the cutting device of the present invention using the same attachments. A full strip cartridge is then installed in the strip cartridge holder, and the procedure for taping using the hand held device of the present invention may then be accomplished.

Figure 6:
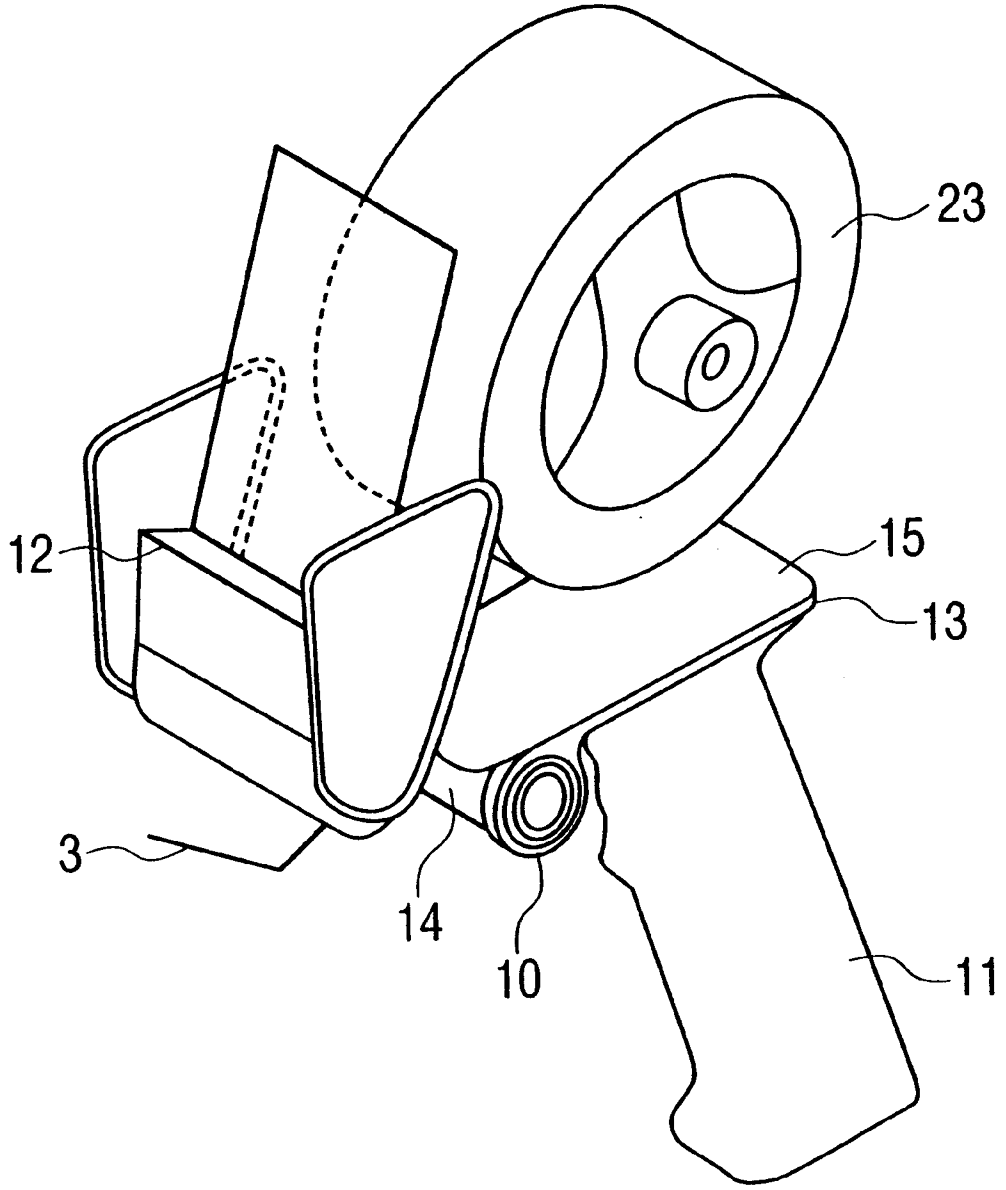
FIG. 6 shows a perspective view of a hand-held tape dispenser constructed according to the present invention.

FIG. 6 presents an overview of the fully assembled hand-hold tape applicator of an embodiment of the present invention.

Figure 7C:
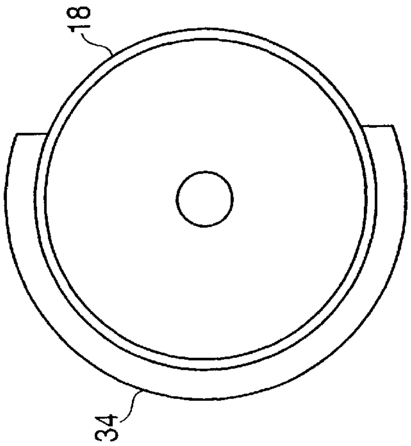
FIGS. 7A, 7B, 7C, and 7D present views of the strip cartridge of an embodiment of the present invention.
Figure 7D:
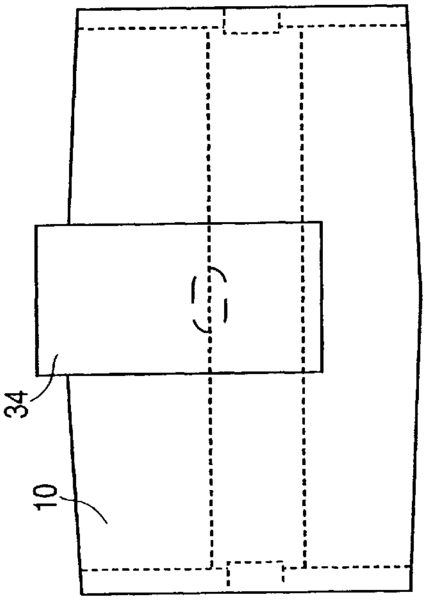
Figure 7B:
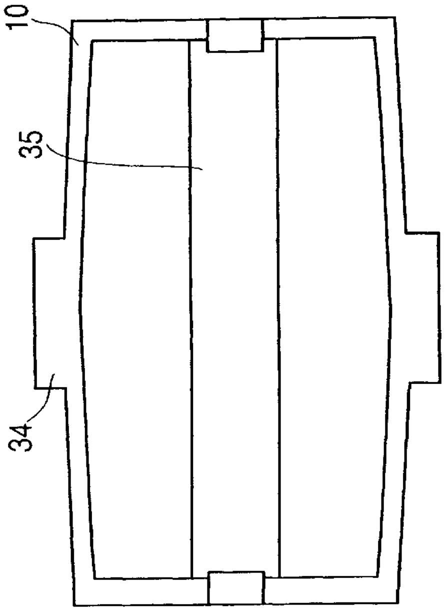
Figure 7A:
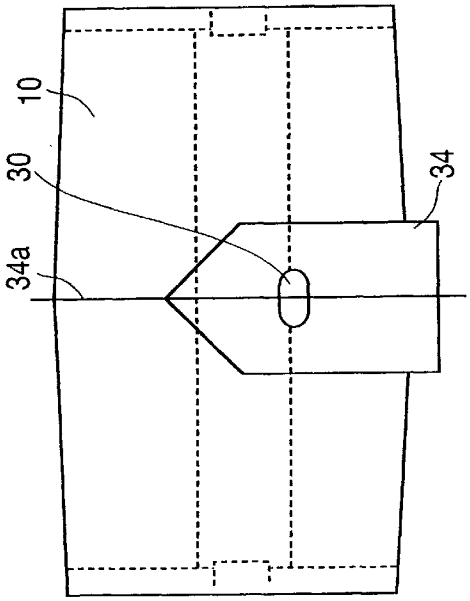

FIGS. 7A, 7B, 7C, and 7D present closeup and cutaway views of an embodiment of the strip cartridge 10. In this arrangement of the invention, as shown in FIG. 7A, a strip cartridge 10, containing a strip (not shown), may be inserted into the cartridge holder (not shown; shown as holders 14 in FIG. 4A). The strip protrudes from a central opening 30 at the center of the cylindrical surface of the strip cartridge 10. A raised securing ridge 34 provides a stable feature for holding the strip cartridge 10 in the cartridge holder (not shown; see FIG. 4A). The pointed edge 34*a* of the raised securing ridge 34 enables insertion and proper positioning of the strip cartridge 10 into finger-like extensions of the cartridge holder (not shown; see FIG. 4A) so that the strip (not shown) is always centered relative to the adhesive tape.

FIG. 7B presents a cross-sectional view of the strip cartridge 10. The strip (not shown) is wound on an internal cylindrical core 35 in a manner so as to bias the strip to present from the central opening (not shown; shown as opening 30 in FIG. 7A). FIG. 7C presents an end view of the strip cartridge 10, with the raised securing ridge 34 indicated. FIG. 7D shows the reverse angle of the strip cartridge 10 and raised ridge 34.

Taping by use of a hand-held embodiment of the present invention is as follows. A user first assures that strip tape cartridge containing strip tape (i.e., non empty cartridge) is loaded into the cartridge holder and fed to the adhesive tape. The strip is then started onto the adhesive tape. The user then applies the adhesive tape and strip combination in the same fashion that an adhesive tape is conventionally applied to the surface of a box or other surface. After applying the tape and strip combination, the user operates, such as by pressing a lever, the two-dimensional cutting device to the tape and strip combination. This cuts the tape and strip combination while simultaneously slitting the tape on either side of the strip.

To open a taped container, a user starts removal of the strip and portion of the adhesive tape at the notched (i.e., between the slits) section of the strip and tape combination. Starting the strip and portion of the adhesive tape is accomplished, for example, by the user inserting a fingernail beneath the notch. Starting is facilitated by the fact that, although the adhesive portion of the tape within the notched area sticks to the surface to which the tape and strip combination is applied, the non-adhesiveness of the strip does not stick to the surface. Once the notch is started, the user simply continues to pull the strip and partial tape combination, which in turn causes the strip to split the adhesive tape along its length at its centerline. The two parallel lengths of split adhesive tape remain on the surface, but the surfaces are now easily separable.

Figure 8:
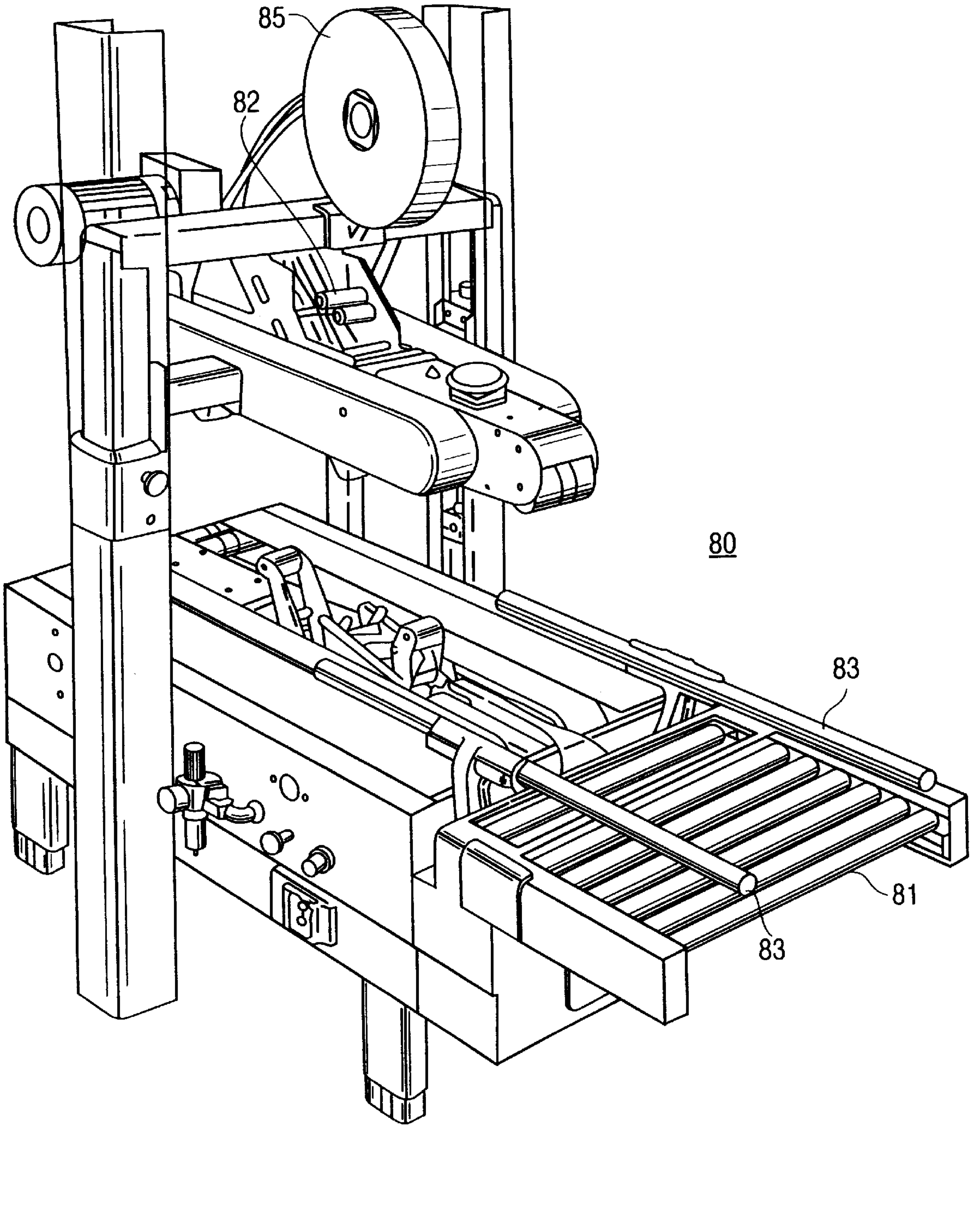
FIG. 8 shows the overall arrangement of an automatic package sealing device of the carton sealing type to which an embodiment of the present invention is to be applied.

FIG. 8 shows an automatic package sealing device 80 to be modified to include the strip cartridge and cutting device of the present invention. The boxes or cartons to be sealed (not shown) are moved along a conveyer mechanism 81 below the location of the taping and automatic cutter arrangement 82. The boxes or cartons are centered between the rails 83, to assure that uniform tape application occurs. When the automatic package sealing device 80 is retrofitted with the two-part taping arrangement of the present invention (not shown in FIG. 8; see FIG. 9), the boxes or cartons (not shown) are automatically sealed with the two-part tape of the present invention in the same manner as conventional taping.

Figure 9:
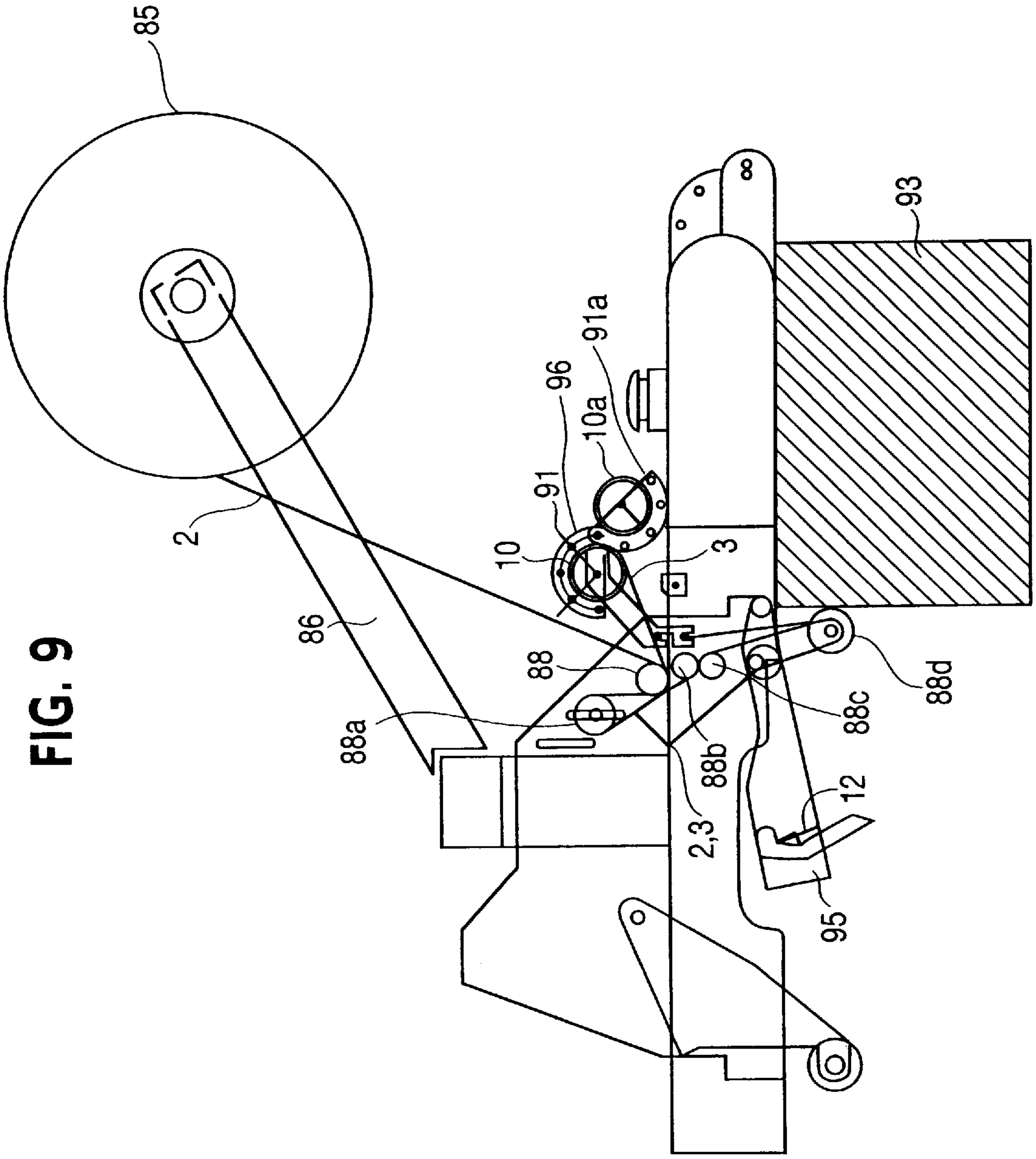
FIG. 9 shows an automatic tape dispenser according to the present invention for use with an automatic package sealing device.

FIG. 9 presents a closeup of the taping and automatic cutter arrangement, according to an embodiment of the present invention. The taping and automatic cutter embodiment includes a conventionally installed tape roll 85 mounted on a bar 86 fixed to the top of the automatic taping machine (not shown; see FIG. 8). Adhesive tape 2 extends to a roller wheel 88 where the strip 3 of the present invention is applied to an adhesive side of the tape 2. This strip 3 is provided from the strip cartridge 10 of an embodiment of the present invention, which is housed in a cartridge holder 91.

As shown in FIG. 9, the combined tape and strip combination 2, 3 is applied to a box 93. Upon sealing the box 93, the box is moved by a conveyer (not shown), from right to left as shown in FIG. 9, past a two-dimensional cutting tool 12 of the present invention, where the tape is cut off and parallel slits (not shown) are made on the tape and strip combination 2, 3 at each side of the strip 3. The two-dimensional cutting tool 12 is mounted on a fixture 95, which pivots after the tape and strip combination 2, 3 has been cut and slitted. The now sealed box 93 can then continue down the assembly line (not shown).

In FIG. 9, the cartridge holder 91 and the strip cartridge 10 of the present invention are also shown in a pivoted position, cartridge holder 91*a* and strip cartridge 10*a*. The cartridge holder 91/91*a* pivots on a pivot point 96. This pivoting feature when the cartridge holder is in the pivoted position 91*a* facilitates manually feeding the adhesive tape through rollers 88, 88*a*, 88*b*, 88*c*, and 88*d*. The cartridge holder in the pivoted position 91*a* also facilitates feeding of the strip 3 extending from the strip cartridge 10 to the application point for combining the adhesive tape 2 and the strip 3 so as to combine the tape and strip 2, 3.

Figure 10:
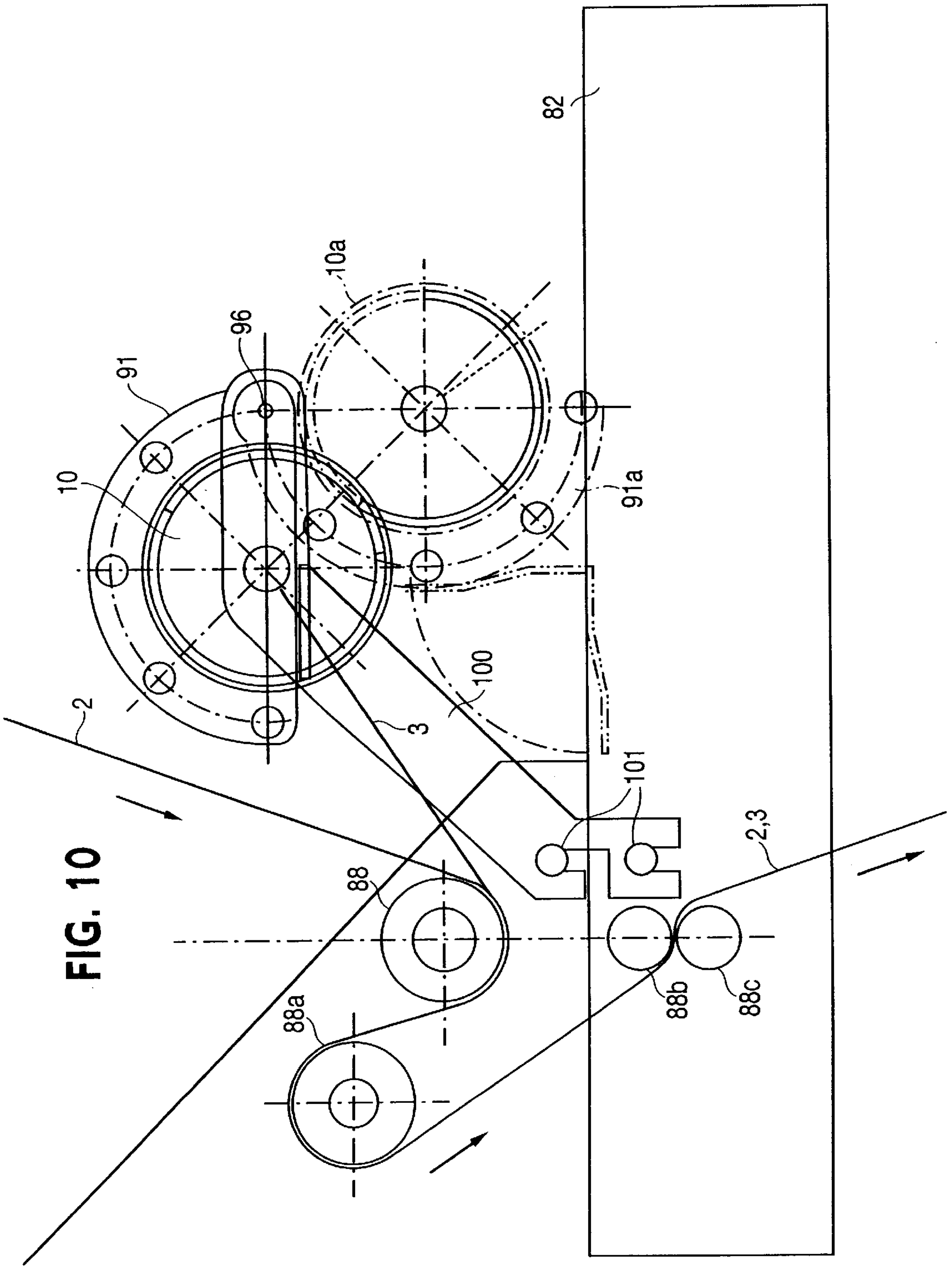
FIG. 10 is a partial side view of the arrangement of the strip cartridge in the combined automatic tape sealing device according to an embodiment of the present invention.
Figure 11:
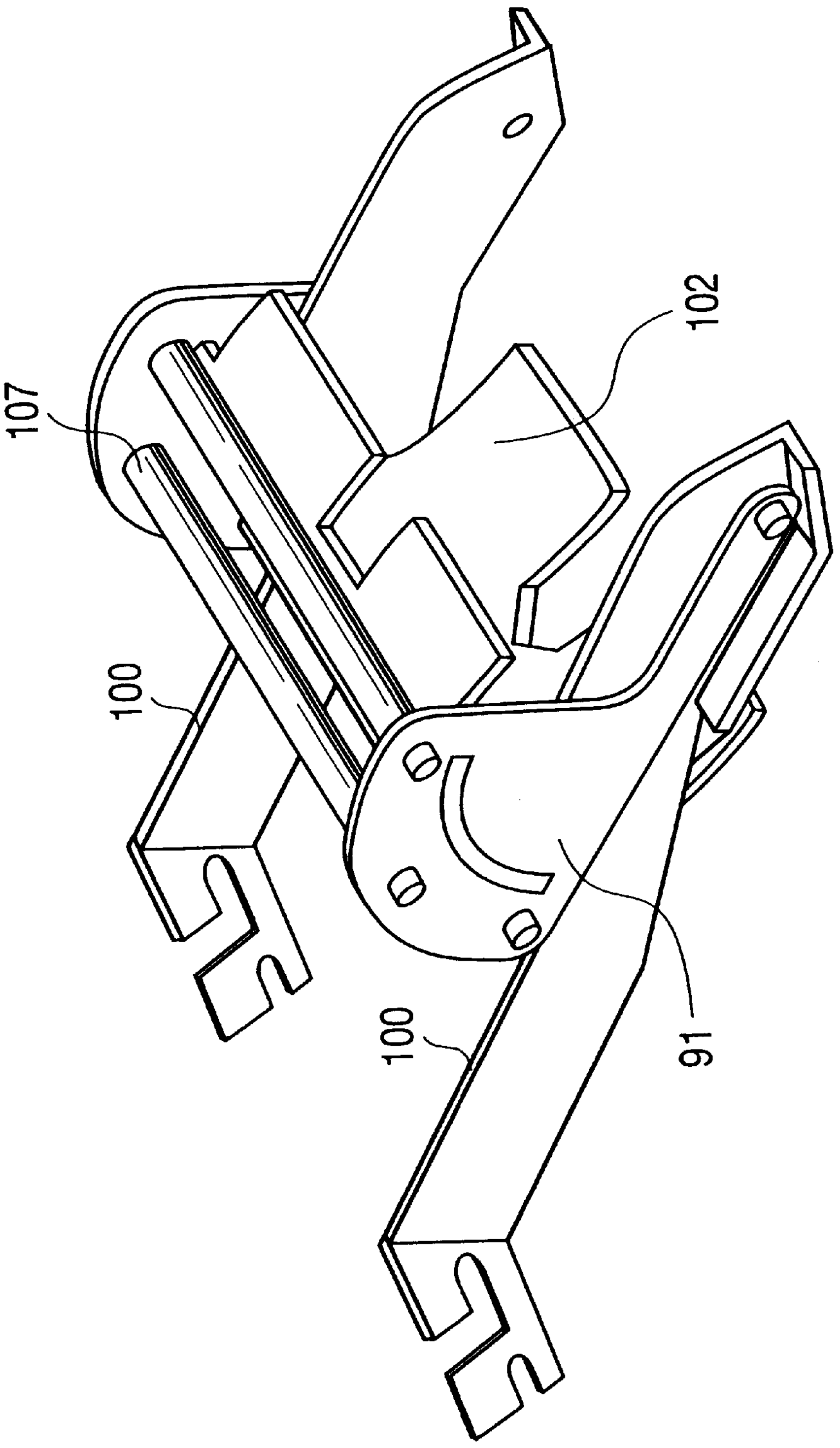
FIG. 11 presents the assembly of the holding structure for the strip cartridge used with the combined automatic taping device of an embodiment of the present invention.

The cartridge holder 91 of the present invention, as shown in FIG. 9, is further detailed in FIGS. 10 and 11. As shown in FIG. 10, an embodiment of the present invention includes the strip cartridge 10 held in a pivoting strip cartridge holder 91, which, in turn, is held by brackets 100. In an embodiment of the present invention, the cartridge holder 91 and strip cartridge 10 are pivotable on a pivot point 96. This feature enables the pivoting of the strip cartridge holder 91 and the strip cartridge 10 to the pivoted position of the strip cartridge holder 91*a* and the strip cartridge 10*a*, as shown in FIG. 10. The pivot point is located on brackets 100. The brackets 100 are in turn held to the structure 82 of an automatic taping device (not shown) at attachment points 101.

As shown in FIG. 11, the two brackets 100, which are fixed to the automatic taping device (not shown), hold the pivoting cartridge holder 91, which includes a bracket 102 for fitting the strip cartridge (not shown). The features and design of the strip cartridge (not shown) and bracket 102 are essentially similar to those corresponding features of the hand-held embodiment.

The method of installing the present invention as an automatic taping device, such as is shown in the embodiment shown in FIGS. 8–11, is as follows. The taping element of a conventional automatic taping device is removed from the automatic taping device. The strip cartridge holder is then attached via its brackets to existing attachment points typically found on the removed taping element of a conventional automatic tape sealer. Alternatively, these attachment points may be added to the taping element. The conventional cutting device of the conventional automatic taping device is removed and replaced with the two-dimensional cutting device of an embodiment of the present invention. Typically this is accomplished by simply removing the screws or other attachments fixing the conventional cutting device and then reattaching the cutting device of the present invention using the same attachments. The removed taping element with the attached strip cartridge holder of the present invention is then reinstalled. The strip cartridge holder is then pivoted down to allow normal feeding of the adhesive tape through the taping rollers. Once the adhesive tape is installed, the strip cartridge holder is then pivoted back. Next, a full strip cartridge is installed in the strip cartridge holder. While the holder is pivoted up, the strip is fed to the application point for combining with the conventional adhesive tape, and the procedure for taping using the automatic device of the present invention may now be accomplished.

An example of the method of taping a box using an automatic case sealer to tape a box or carton is shown in the embodiment of FIGS. 8–11, as follows. A user first assures that strip tape cartridge containing strip tape (i.e., non empty cartridge) is loaded into the cartridge holder and fed to the adhesive tape. The strip is then started onto the adhesive tape. The user then simply feeds a box or carton for taping into the conveyer of the automatic case sealer of the present invention as is normally accomplished with the conventional automatic tape sealer. The automatic case sealer of the present invention automatically tapes the box or carton with the combination tape and strip and then cuts the tape and strip combination while simultaneously slitting the tape on either side of the strip.

Opening a box or carton that has been taped using the automatic case sealer of the present invention is similar to the method for opening a container via severing tape applied by the hand-held device of the present invention.

What is claimed is:

1. A method for taping surfaces using a hand-held tape dispenser for dispensing a combination tape and tape severing strip, said method comprising the steps of:

dispensing a tape having an adhesive side from a supply of said tape in said hand-held dispenser;

dispensing a tape severing strip from a supply of said strip in said hand-held tape dispenser;

automatically applying said strip to said adhesive side of said tape in said dispenser to form a continuous length of said combination tape and tape severing strip as said combination tape and tape severing strip is applied to a surface to be taped by a user with said handheld dispenser; and cutting a length of said combination tape and strip from said continuous length thereof with a cutting tool of said hand-held tape dispenser such that a cut end is formed to be applied to said surface and a cut end is formed to remain in said dispenser while simultaneously slitting said tape of said combination adjacent and parallel to and on both sides of said applied strip at said cut end to be applied to said surface and at said cut end to remain in said dispenser.

2. A method of installing a tape peeling strip device to a hand-held tape applicator having a handle, a body, and a cutter, comprising the steps of:

removing said cutter;

replacing said cutter with a combination cutting and slitting tool for cutting the tape and said tape peeling strip such that a cut end is formed to be applied to a surface and a cut end is formed to remain in said applicator and for slitting said tape adjacent and parallel to and on both sides of said applied tape peeling strip at said cut end to be applied to said surface and at said cut end to remain in said applicator;

detaching said handle;

inserting a strip cartridge holder, for holding and dispensing said tape peeling strip, with bracket attachment between said handle and said body; and reattaching said handle such that said strip cartridge holder bracket is held between said handle and said body.

3. A hand-held tape dispenser for applying a tape severing strip to an adhesive side of a tape to form a combination tape and tape severing strip and applying said combination tape and tape severing strip to a surface with said dispenser, said dispenser comprising:

a first dispensing means attached to a frame for dispensing a tape having an adhesive side for application to said surface;

a second dispensing means attached to said frame for dispensing a tape severing strip for application to said adhesive side of said tape;

applying means for applying said tape severing strip to said adhesive side of said tape to form said combination tape and tape severing strip as a user applies said combination tape and tape severing strip to said surface by hand, using said dispenser;

cutting means attached to said frame for cutting said tape and said strip of said combination tape and tape severing strip such that a cut end is formed to be applied to said surface and a cut end is formed to remain in said dispenser;

slitting means attached to a frame for automatically slitting said tape adjacent and parallel to and on both sides of said applied strip at said cut end to be applied to said surface and at said cut end to remain in said dispenser; and wherein said frame comprises a handle for hand-held use.

4. A tape dispenser according to claim 3, wherein said applied strip is centrally disposed on said tape.

5. A tape dispenser according to claim 3, wherein said slits enable separating of said strip from said tape such that said tape is split.

6. A tape dispenser according to claim 3, wherein said strip is comprised of a plastic material.

7. A tape dispenser according to claim 3, wherein said first dispensing means is removable and replaceable.

8. A tape dispenser according to claim 3, wherein said second dispensing means is removable and replaceable.

9. A tape dispenser according to claim 3, wherein said second dispensing means comprises a cylindrical spool.

10. A tape dispenser according to claim 3, wherein said second dispensing means comprises a cartridge.

11. A tape dispenser according to claim 10, wherein said cartridge comprises said strip wound on an axial, cylindrical core enclosed within a cylindrical wall having an opening for presenting said strip.

12. A tape dispenser according to claim 3, wherein said cutting means comprises a serrated edge.

13. A tape dispenser according to claim 3 wherein said slitting means comprises cutting teeth disposed parallel to the direction of said first dispensing means and said second dispensing means.

14. A tape dispenser according to claim 3, wherein said cutting means and said slitting means are disposed in opposing relationship to one another.

* * * * *